United States Patent
Hamilton et al.

(10) Patent No.: US 9,757,758 B2
(45) Date of Patent: Sep. 12, 2017

(54) PROCESSES AND DEVICES FOR APPLYING COATINGS TO THE INTERIOR OF TUBES

(75) Inventors: Holly-Bruce Hamilton, Deep River (CA); Andrew Bergeron, Deep River (CA); Blain Clatworthy, Chalk River (CA); Tim Stoddard, Pembroke (CA)

(73) Assignee: ATOMIC ENERGY OF CANADA LIMITED, Chalk River (CA)

( * ) Notice: Subject to any disclaimer, the term of this patent is extended or adjusted under 35 U.S.C. 154(b) by 0 days.

(21) Appl. No.: 14/003,735

(22) PCT Filed: Mar. 7, 2012

(86) PCT No.: PCT/CA2012/000208
§ 371 (c)(1),
(2), (4) Date: Dec. 20, 2013

(87) PCT Pub. No.: WO2012/119234
PCT Pub. Date: Sep. 13, 2012

(65) Prior Publication Data
US 2014/0099440 A1 Apr. 10, 2014

Related U.S. Application Data

(60) Provisional application No. 61/449,957, filed on Mar. 7, 2011.

(51) Int. Cl.
*B05D 7/22* (2006.01)
*B05C 7/08* (2006.01)
(Continued)

(52) U.S. Cl.
CPC .................. *B05C 7/08* (2013.01); *B05C 3/18* (2013.01); *B05C 11/021* (2013.01); *B05D 1/40* (2013.01);
(Continued)

(58) Field of Classification Search
CPC .. B05D 7/22; B05D 7/222; B05C 7/04; B05C 7/08
(Continued)

(56) References Cited

U.S. PATENT DOCUMENTS

| 3,705,569 A | 12/1972 | Kasano et al. ................ 118/105 |
| 4,069,535 A | 1/1978 | Cato ........................ 15/104.061 |

(Continued)

FOREIGN PATENT DOCUMENTS

| CA | 1017138 A | * 9/1977 |
| CA | 1 043 644 A1 | * 12/1978 |

(Continued)

OTHER PUBLICATIONS

Search Report and Written Opinion in International Application No. PCT/CA2012/000208 mailed May 29, 2012.
(Continued)

*Primary Examiner* — William Phillip Fletcher, III
(74) *Attorney, Agent, or Firm* — Norton Rose Fulbright US LLP

(57) ABSTRACT

Processes and devices useful in the application of coatings (14) to the interior of tubes (10) are described. Such processes (40, 400) may include applying a layer (20) of coating fluid (18) to the internal surface (16) of the tube (10) and passing a smoothing member (22) through the tube (10) at a distance from the internal surface (16). The viscosity of the coating fluid (18) may be selected so that the layer (20) of coating fluid (18) has a thickness substantially equal to or in excess of a predetermined wet film thickness (Twf) correlated to a desired final thickness (Tf) of the coating (14). The distance between the smoothing member (22) and the internal surface (16) may substantially correspond to the predetermined wet film thickness (Twf). The smoothing member (22) may smooth the coating fluid (18) and remove coating (Continued)

fluid (18) in excess of the wet film thickness (Twf) from the internal surface (16).

19 Claims, 7 Drawing Sheets

(51) Int. Cl.
| | |
|---|---|
| *F16L 58/14* | (2006.01) |
| *G21C 3/20* | (2006.01) |
| *G21C 21/02* | (2006.01) |
| *B05C 3/18* | (2006.01) |
| *B05C 11/02* | (2006.01) |
| *B05D 1/40* | (2006.01) |
| *B05D 1/42* | (2006.01) |

(52) U.S. Cl.
CPC ............. *B05D 7/222* (2013.01); *F16L 58/14* (2013.01); *G21C 3/20* (2013.01); *G21C 21/02* (2013.01); *B05D 1/42* (2013.01); *Y02E 30/40* (2013.01)

(58) Field of Classification Search
USPC .................. 427/230, 235, 239, 355; 118/105
See application file for complete search history.

(56) References Cited

U.S. PATENT DOCUMENTS

| | | | | |
|---|---|---|---|---|
| 4,425,385 | A * | 1/1984 | Coulter et al. | 427/238 |
| 5,230,842 | A * | 7/1993 | Munde | 264/34 |
| 5,326,400 | A * | 7/1994 | Sagawa | 118/105 |
| 5,855,676 | A * | 1/1999 | Lu | B05C 7/04 |
| | | | | 118/105 |
| 7,270,847 | B2 * | 9/2007 | Horn | 427/230 |

FOREIGN PATENT DOCUMENTS

| | | | |
|---|---|---|---|
| CA | 1043644 | A1 | 12/1978 |
| CA | 2286358 | A1 | 10/1988 |
| CA | 2 286 358 | C * | 10/1998 |
| CN | 1256006 | | 6/2000 |
| CN | 101378843 | | 3/2009 |
| DE | 1149421 | | 5/1963 |
| JP | 3074005 | | 5/1992 |

OTHER PUBLICATIONS

International Preliminary Report on Patentability in International Application No. PCT/CA2012/000208 issued Sep. 10, 2013.
Office Action in Chinese Application No. 201280018763.8 ussied Sep. 2, 2014.
Supplementary European Search Report issued in EP 12754603.4, mailed Dec. 19, 2014.

* cited by examiner

PROCESSES AND DEVICES FOR APPLYING COATINGS TO THE INTERIOR OF TUBES

CROSS-REFERENCE TO RELATED APPLICATIONS

This application is a national phase application under 35 U.S.C. §371 of International Application No. PCT/CA2012/000208 filed 7 Mar. 2012, which claims priority to U.S. Provisional Application No. 61/449,957 filed 7 Mar. 2011. The entire contents of each of the above-referenced disclosures is specifically incorporated herein by reference without disclaimer.

TECHNICAL FIELD

The disclosure relates generally to the application of coatings, and more particularly to the application of coatings to internal surfaces of tubes.

BACKGROUND OF THE ART

Tubes having an internal coating are widely used in industrial and commercial applications. Coatings can serve a variety of purposes, and are used to provide, for example, corrosion protection to tube material under high temperature, pressure, or chemically corrosive conditions that may damage the structural integrity of the tube. Coatings can also improve the wear resistance of tubes subject to harsh conditions and hence lengthen the operating life of such tubes.

In nuclear applications, fuel tube sheaths having interior graphite-based coatings enhance the performance of the fuel. In a CANDU® (CANada Deuterium Uranium) reactor, uranium pellet fuel is loaded into Zircaloy™ sheath tubing that has been pre-coated with graphite. The graphite coating is produced by pre-coating the sheaths with a graphite suspension (i.e. slurry), which is subsequently dried to form the graphite coating.

Various methods of preparing tubes having internal coatings have been described. One commonly employed method is spray coating, wherein a spraying apparatus is advanced along the interior of a tube and a coating material is delivered to the internal surface of the tube by spraying. Tubes can also be coated by applying a coating material inside the tube, positioning the tube in a horizontal position, and rolling the tube to create a relatively uniform coating on the internal surface of the tube. Coatings may be applied, for example, as solutions, suspensions/slurries, and emulsions. Many coatings require drying after application, which can be accomplished either at ambient conditions, or by exposing the wet coating to a gas stream, vacuum, increased temperature, or a combination thereof. Some coatings also require subsequent curing, which often involves elevated temperature, either to achieve the desired properties of the coating or to ensure adherence of the coating material to the tube.

Pigs or plugs adapted to pass inside installed pipelines are known to be useful in re-surfacing the interior of oil, gas, and other fluid conduits. There are different types of pigs known, from simple bullet-shaped pigs to more complex designs including spirally configured devices which turn upon progression through a tube (U.S. Pat. No. 4,425,385), pigs with spaced annular rings (U.S. Pat. No. 4,069,535), and pigs with brushes (U.S. Pat. No. 5,326,400). In use, a fluid is provided to an open end of an elongated pipe, the pig is inserted to the same end of the pipe and the pig is propelled through the pipe. Some pigs can be advanced using a pressurized fluid such as hydraulic fluid or compressed gas introduced to the trailing edge of the pig to cause the pig to be propelled through the pipe and also cause the pig to be sealingly engaged to the inside surface of the pipe. Pigs are also used in the pipeline industry to de-scale and clean the internal surface of operational pipelines to decrease heat or fluid loss and to improve the integrity and lifetime of the pipe.

One tube coating method known as 'flood coating' includes filling a tube with a coating fluid which is then allowed to drain from the tube by gravity. Low viscosity coating fluids are used with this process to provide a thin coating layer less than approximately 10 microns thick. In a flood coating method, a low viscosity coating fluid is required to provide a uniform coating surface. Coatings formed by this method often have a gradient as the thickness of the coating increases from the top of the tube to the bottom. To increase the overall coating thickness using flood coating, after the coating layer is dried an additional flood coating can be applied. However, after more than a few coatings, the coating layer reaches a maximum thickness where it cannot be further increased. This is due to the coating fluid starting to dissolve the previously deposited coating layer(s). Furthermore, the multiple application of coating layers to achieve a desired final coating thickness is time-consuming, laborious, and therefore expensive.

Improvement in the application of coatings to internal surfaces of tubes is therefore desirable.

SUMMARY

In various aspects, for example, the disclosure describes processes, devices and kits for use in the application of coatings to the interior of tubes.

Thus, in one aspect, the disclosure describes a process for use in the application of a coating of a desired final thickness to at least a portion of an internal surface of a tube. The process may comprise: applying a layer of coating fluid to the portion of the internal surface of the tube, the coating fluid having a viscosity selected so that the applied layer of coating fluid has a thickness substantially equal to or in excess of a predetermined wet film thickness correlated to the desired final thickness of the coating; and passing a smoothing member through the tube in a spaced-apart relationship relative to, and at a minimum distance from, the coating fluid-applied portion of the internal surface of the tube, the minimum distance corresponding substantially to the wet film thickness, the smoothing member being configured to smooth the coating fluid and remove coating fluid in excess of the wet film thickness from the coating fluid-applied portion of the internal surface of the tube.

In another aspect, the disclosure describes a process for use in the application of a coating of a desired final thickness to an inside surface of a nuclear fuel sheath. The process may comprise: applying a layer of coating fluid to the inside surface of the sheath, the coating fluid having a viscosity selected so that the applied layer of coating fluid has a thickness substantially equal to or in excess of a predetermined wet film thickness correlated to the desired final thickness of the coating; and passing a smoothing member through an inside cavity of the sheath while substantially maintaining a minimum separating distance between the smoothing member and the inside surface of the sheath, the minimum separating distance corresponding substantially to the wet film thickness, the smoothing member being configured to smooth the coating fluid and remove coating fluid in excess of the wet film thickness from the inside surface of the sheath.

For example, in various embodiments the tube(s) and/or sheath(s) or at least a portion of the tube(s) and/or sheath(s) may be supported in a substantially upright (e.g. substantially vertical) orientation prior to the passing of the smoothing member. Accordingly, the passing of the smoothing member through an inside cavity of the tube/sheath may comprise allowing the smoothing member to fall freely under influence of gravity.

In another aspect, the disclosure describes a process for use in the application of a coating to at least a portion of an internal surface of a tube. The process may comprise: applying a layer of coating fluid to the portion of the internal surface of the tube, the layer of coating having a thickness substantially equal to or in excess of a desired wet film thickness; and passing a smoothing member through the tube in a spaced-apart relationship relative to, and at a minimum distance from, the coating fluid-applied portion of the internal surface of the tube, the minimum distance corresponding substantially to the wet film thickness of the layer of coating fluid, the smoothing member being configured to smooth the coating fluid and remove coating fluid in excess of the wet film thickness from the coating fluid-applied portion of the internal surface of the tube.

In a further aspect, the disclosure describes a kit for use in the application of a coating of a desired final thickness to an internal surface of a tube having a predetermined cross-sectional dimension. The kit may comprise: a coating fluid for application to the internal surface of the tube, the coating fluid being adapted to produce a layer of coating fluid having a thickness substantially equal to or in excess of a predetermined wet film thickness correlated to the desired final thickness of the coating; and a smoothing member configured to be passed through the tube while substantially maintaining a minimum separating distance between the smoothing member and the internal surface of the tube, the minimum separating distance corresponding substantially to the wet film thickness of the coating fluid.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

Figure 1:
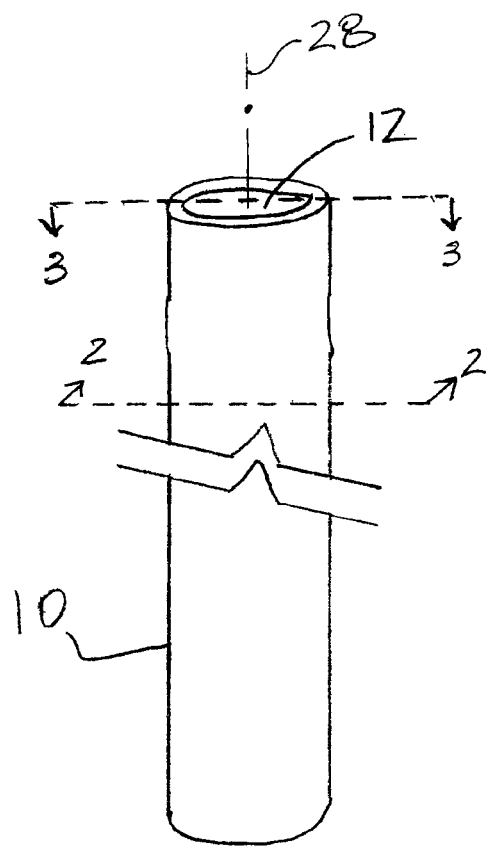
FIG. 1 shows an isometric view of a tube having an internal surface suitable for coating.

FIG. 1 shows tube 10 which may be suitable for use in conjunction with processes and devices described herein. Tube 10 may be any type of tube suitable for use in various applications such as, for example, industrial, commercial, chemical and/or nuclear applications. Tube 10 may comprise internal cavity 12, which may have a generally circular cross-section. Alternatively, it will be apparent that tubes having internal cavities of other cross-sectional profiles such as square, rectangular, triangular, oval, non-circular and/or other profiles may also be suitable for use with the processes and devices described herein.

Tube 10 may comprise, for example, a nuclear fuel sheath adapted to receive uranium pellet fuel commonly used in nuclear applications such as in CANDU® (CANada Deuterium Uranium) reactors. Accordingly, tube 10 may be made of any material(s) commonly used in such applications such as, for example, Zircaloy™. Depending on the application and conditions to which tube 10 may be subjected, it may be desirable that the inside of tube 10 contain one or more coating(s) that improve(s) the properties and hence the performance of tube 10. In the case of a sheath for nuclear fuel, it may be desirable that the inside of tube 10 comprise a coating. The coating may include a ceramic coating such as a graphite-based coating for example.

Figure 2:
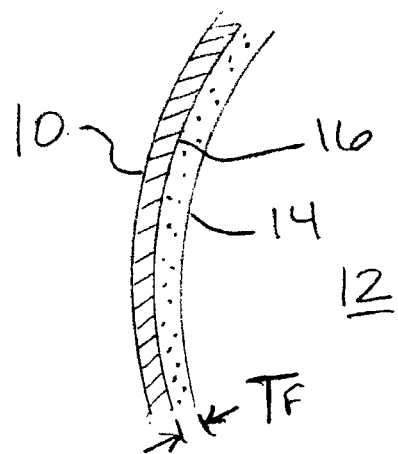
FIG. 2 shows a partial, enlarged transverse cross-section of the tube of FIG. 1 along line 2-2 of FIG. 1 with a coating applied to the internal surface thereof.

FIG. 2 shows a partial, enlarged transverse cross-section of tube 10 along line 2-2 of FIG. 1 having exemplary coating(s) 14 applied to internal surface(s) 16 of tube 10. Coating(s) 14 may be applied to substantially the entire internal surface(s) 16 of tube 10 or, alternatively, to at least a portion of internal surface(s) 16. Coating(s) 14 may have a desired final thickness Tf as illustrated in FIG. 2. Final thickness Tf may correspond to the desired thickness of coating(s) 14 after curing and/or drying. The final thickness Tf may correspond to a desired minimum thickness required for coating(s) 14. In nuclear applications, fuel sheaths having interior graphite-based coatings can enhance the performance of the nuclear fuel. According with the present disclosure, the graphite coating(s) may be achieved by pre-coating the tube 10 (e.g. sheath) with a graphite slurry, which may be applied to internal surface(s) 16 of tube 10 and subsequently dried to produce a graphite coating of a desired final thickness Tf.

Figure 3A:
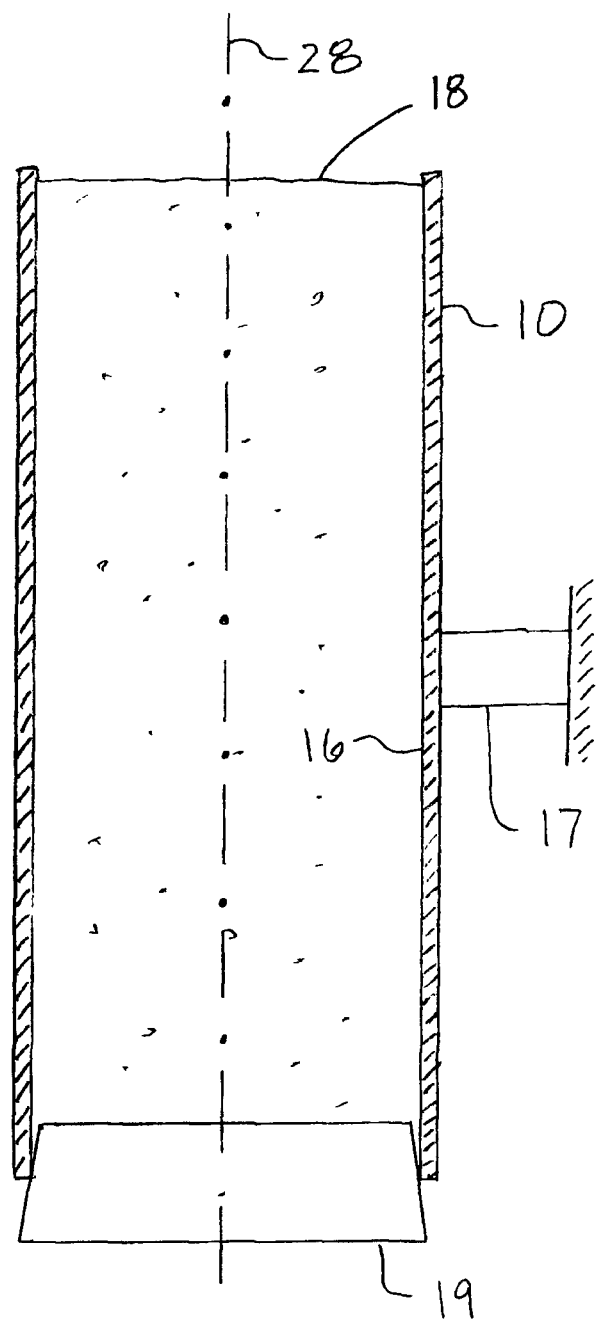
FIG. 3A shows a longitudinal cross-section of the tube of FIG. 1 along line 3-3 of FIG. 1 where the tube has been filled with coating fluid.
Figure 3B:
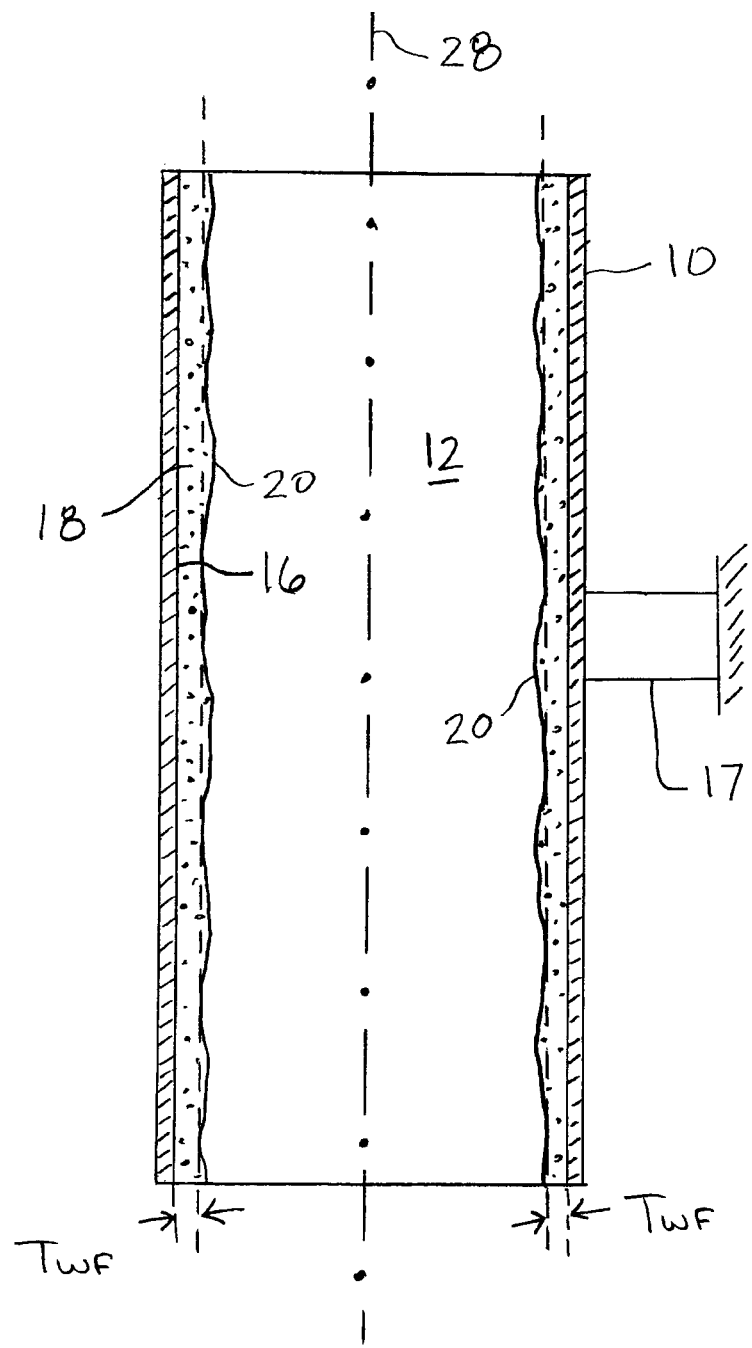
FIG. 3B shows a longitudinal cross-section of the tube of FIG. 1 along line 3-3 of FIG. 1 where some of the coating fluid has been permitted to drain from the tube.
Figure 3C:
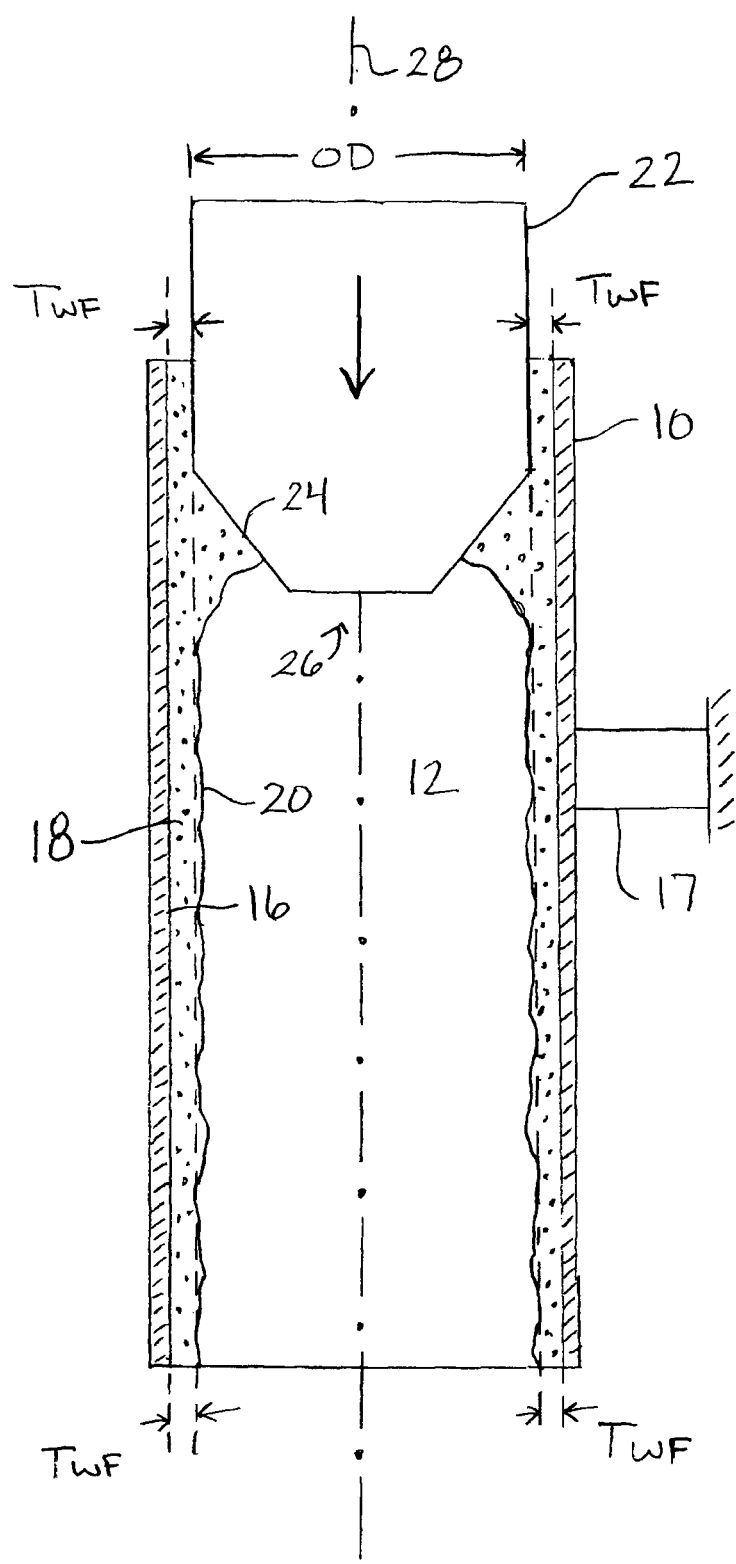
FIG. 3C shows a longitudinal cross-section of the tube of FIG. 1 along line 3-3 of FIG. 1 during smoothing of the coating fluid.

FIGS. 3A-3C each show an enlarged, longitudinal cross-section of tube 10 and schematically illustrate a process for use in the application of coating(s) 14 of desired final thickness Tf to at least a portion of internal surface(s) 16 of tube 10. FIG. 3A shows tube 10 which has been substantially filled with coating fluid(s) 18 so that coating fluid(s) 18 may be applied to internal surface(s) 16 of tube 10. Tube 10 may be supported by means of a suitable support schematically shown at 17. Support 17 may include, for example, a burette holder, a tube rack and/or other suitable structure. A suitable stopper 19 may be used to substantially seal one end of tube 10 during filling of tube 10 with coating fluid(s) 18. FIG. 3B shows a tube 10 from which some of coating fluid(s) 18 has been permitted to drain from tube 10 and layer 20 of coating fluid(s) 18 remains in tube 10. Layer 20 of coating fluid(s) 18 may, prior to passing of smoothing member 22, have a varying thickness that is substantially equal to or exceeds predetermined wet film thickness Twf selected based on the desired final thickness Tf of coating(s) 14. FIG. 3C shows smoothing member 22 being passed through internal cavity 12 of tube 10. Smoothing member 22 has an overall (i.e. maximum) outer dimension OD that is smaller than a corresponding overall (i.e. maximum) dimension of internal cavity 12 so as to leave a clearance between smoothing member 22 and internal surface(s) 16 of tube 10 during passing of smoothing member 22. The clearance between smoothing member 22 and internal surface(s) 16 of tube 10 may be substantially equal to wet film thickness Twf. Smoothing member 22 may have a shape that provides a self-centering effect during passing of smoothing member 22 through tube 10. For example, smoothing member 22 may be generally "bullet-shaped". For example, smoothing member 22 may have frusto-conical surface 24 at leading end 26 of smoothing member 22. Accordingly, the self-centering properties of smoothing member 22 may allow smoothing member 22 to be passed through tube 10 substantially along (e.g. coaxially with) central axis 28 of tube 10.

Figure 4A:
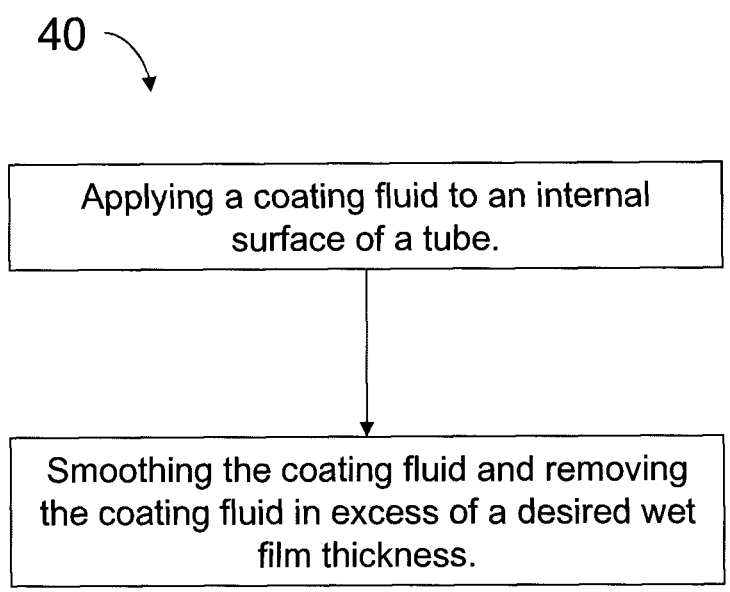
FIG. 4A is a flowchart illustrating processes for coating the internal surface of the tube according to one embodiment.
Figure 4B:
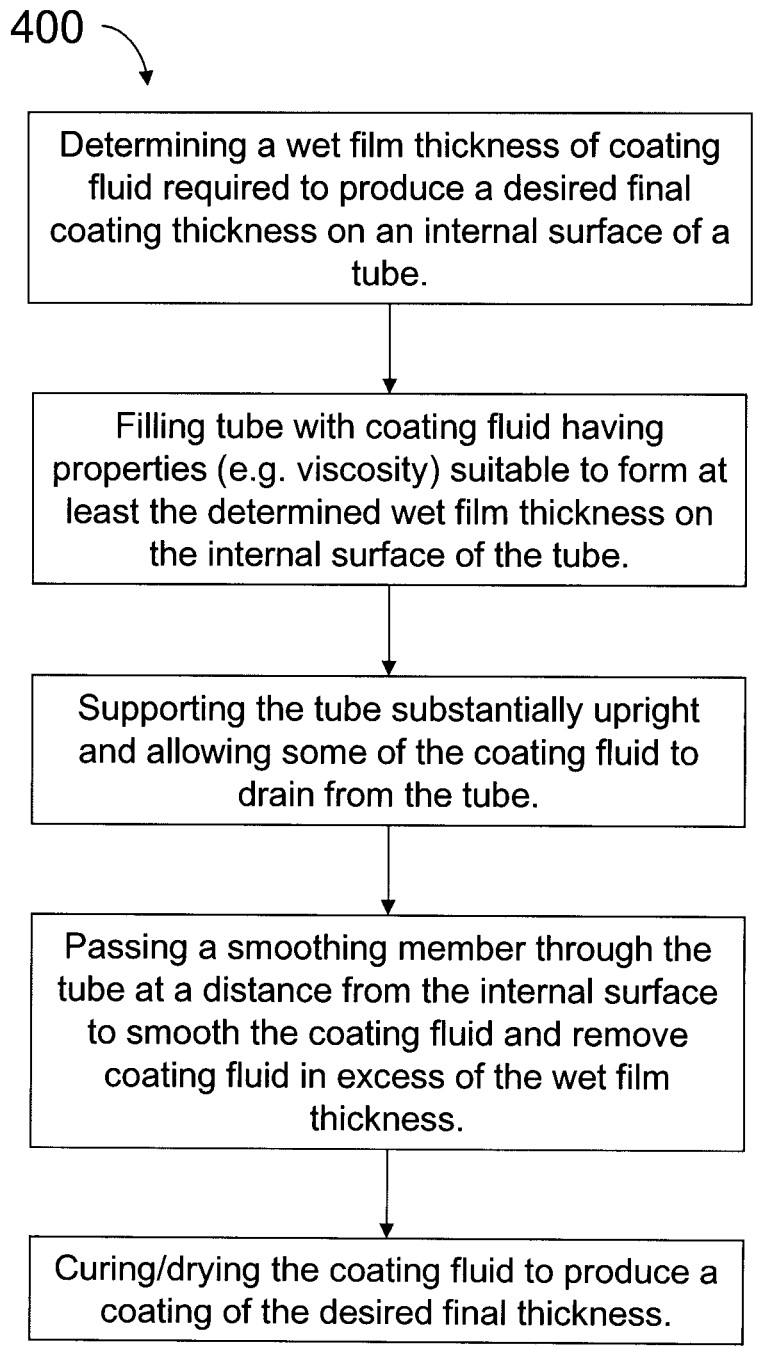
FIG. 4B is a flowchart illustrating processes for coating the internal surface of the tube according to another embodiment.

FIGS. 4A and 4B show flowcharts illustrating processes 40, 400 that may be useful in the application of coating(s) 14 to internal surface(s) 16 of tube 10. The following description of various processes 40, 400 useful in the application of coating(s) 14 are also described in reference to FIGS. 3A-3C.

In reference to FIG. 4A, process(es) 40 may, for example include: applying coating fluid(s) 18 to internal surface(s) 16 of tube 10; and smoothing coating fluid(s) 18 and removing coating fluid(s) 18 in excess of the wet film thickness Twf. Specifically, coating fluid(s) 18 may be applied such that layer 20 of coating fluid(s) 18 is applied to at least a coating fluid-applied portion of internal surface(s) 16 of tube 10. Coating fluid(s) 18 may have a viscosity selected so that layer 20 of coating fluid(s) 18 has a thickness substantially equal to or in excess of wet film thickness Twf correlated to the desired final thickness Tf of coating(s) 14 (see FIG. 3B). The smoothing of coating fluid(s) 18 may be done by passing smoothing member 22 through tube 10 in a spaced-apart relationship relative to, and at a minimum distance (e.g. Twf) from the coating fluid-applied portion of internal surface(s) 16 of tube 10. The minimum distance between smoothing member 22 and internal surface(s) 16 of tube 10 may corresponding substantially to wet film thickness Twf. Smoothing member 22 may be configured to smooth coating fluid(s) 18 and also remove coating fluid(s) 18 in excess of wet film thickness Twf from the coating fluid-applied portion of the internal surface(s) 16 of tube 10.

In reference to FIG. 4B, process(es) 400 may for example, include:
  determining wet film thickness Twf of coating fluid(s) 18 required to produce a desired final thickness Tf of coating(s) 14 on internal surface(s) 16 of tube 10;
  filling tube 10 with coating fluid(s) 18 (see FIG. 3A) having properties (e.g. viscosity) to form at least the predetermined wet film thickness Twf on internal surface(s) 16 of the tube 10;
  supporting tube 10 substantially upright and allowing some of the coating fluid(s) 18 to drain from the tube 10 (see FIG. 3B);
  passing smoothing member 22 through tube 10 at a minimum separating distance from internal surface(s) 16 to smooth coating fluid(s) 18 and remove coating fluid(s) 18 in excess of wet film thickness Twf (see FIG. 3C); and
  curing/drying coating fluid(s) 18 to produce coating(s) 14 of the desired final thickness Tf.

Processes 40,400 may comprise supporting and/or orienting tube 10 so that at least the portion of internal surface(s) 16 of tube 10 that is being coated is in a substantially upright orientation prior to the passing of the smoothing member 22. For example, tube 10 may be oriented so that central axis 28 of tube is substantially vertical. This may be done so that smoothing member 22 may be passed (i.e. dropped) across the coating fluid-applied portion of internal surface(s) 16 of tube 10 under the influence of gravity. For example, smoothing member 22 may be allowed to fall freely through tube 10 exclusively under influence of gravity. Alternatively, smoothing member 22 may be propelled (e.g. pushed and/or pulled) through tube 10 during passing. The upright orientation of tube 10 may also allow for the application of a substantially uniform coating(s) 14 across internal surface(s) 16 of tube 10. In some applications, it may be desirable that coating fluid(s) 18 be applied at elevated temperatures (e.g. higher than room temperature) so that coating fluid(s) 18 may dry/cure more quickly on tube 10.

During filling of tube 10 with coating fluid(s) 18 while tube 10 is supported in the substantially upright orientation, one end (i.e. the bottom end) of tube 10 may be stoppered, and tube 10 may be filled with coating fluid(s) 18 within about 0.5 cm of the top of tube 10 (see FIG. 3A). Alternatively, coating fluid(s) 18 may, for example, be injected into the bottom of tube 10 and tube 10 may be filled with coating fluid(s) 18 using a suitable coating fluid dispensing means (e.g. syringe) substantially sealed to the bottom of the tube 10. After filling, stopper 19 may then be removed so that tube 10 may be permitted to drain of excess coating fluid(s) 18 (see FIG. 3B). Smoothing member 22 may be introduced into internal cavity 12 of tube 10 from the top end of tube 10 and allowed to drop (i.e. free fall downwardly) through tube 10 under the influence of gravity and/or other propulsion means through and out of the bottom of tube 10 (see FIG. 3C). As the coating fluid(s) 18 adheres to internal surface(s) 16 of tube 10 by reason of suitable selection of viscosity, layer 20 of coating fluid(s) 18 may interact with smoothing member 22 to self-center smoothing member 22 during passing of smoothing member 22 through tube 10. The passing of smoothing member 22 may provides a relatively uniform thickness of coating fluid(s) 18 and consequently a relatively uniform final thickness Tf of coating(s) 14 on internal surface(s) 16 of tube 10. Coating fluid(s) 18 may be permitted to dry on internal surface(s) 16 of tube 10 in order to form coating(s) 14 of final thickness Tf. Tube 10 may be also baked in an air or vacuum oven, or exposed to an air stream or vacuum, to drive off excess solvent or additives and/or cure the coating material.

Coating fluid(s) 18 may, for example, be in the form of a solution, emulsion, colloid, slurry or a combination thereof. Accordingly, coating fluid(s) 18 may comprise a slurry (i.e. suspension) comprising a solvent or mixture of solvents which can evaporate upon drying under standard temperature and pressure conditions, and coating material(s). For example, coating fluid(s) 18 may contain organic solvent(s) or water together with coating material(s) which may include ceramic grade powders, resins, polymers, and/or particulate matter to be coated on internal surface(s) 16 of tube 10. The solvent(s) may help maintain the coating material(s) in a slurry form in coating fluid(s) 18, and may also be chemically compatible with the associated materials such that the solvent(s) do(es) not react with either tube 10 and/or the coating material(s). One or more aqueous solvents may be used, as well as organic solvents and/or combinations thereof. For example, some organic solvents may be suitable in some applications and may include, for example, C1-C6 hydrocarbons having one or more hydroxyl groups, such as, for example isopropanol or ethanol.

The solvent(s) can either be used on its/their own, or mixed together with one or more additional solvents and/or additives to achieve the desired slurry viscosity and/or other desired properties such as density and surface tension. For example, the viscosity and/or other properties of coating fluid(s) 18 may be adjusted by adjusting a solids concentration of the coating fluid(s) 18 (e.g. slurry). Since the wet film thickness Twf of coating fluid(s) 18 may be correlated to the final thickness Tf (e.g. after curing/drying) of coating(s) 14, the selection of a viscosity and/or other properties of coating fluid(s) 18 may be based on the desired wet film thickness Twf required to produce the final thickness Tf of coating(s) 14. Accordingly, by proper selection of the properties of coating fluid(s) 18 and smoothing member 22, it may be possible to achieve a desired final thickness of coating(s) 14 in a single application of coating fluid(s) 18.

Coating fluid(s) 18 may also comprises a coating material(s) that include(s) a ceramic grade powder, resin, polymer, graphite, metal oxide, carbide, particulate matter, or combinations thereof depending on the particular application and physical/chemical/mechanical properties that are required from coating(s) 14. The coating material(s) in the coating fluid(s) 18 may have a fine particle size and narrow size distribution to provide coating(s) 14 with a substantially uniform thickness on internal surface(s) 16 of tube 10. Optionally, coating fluid(s) 18 may also include one or more of a surfactant, emulsifier, salt, binder and a thickening agent. For example, in some applications, suitable coating fluid(s) 18 may comprise a commercially available DAG® 154 suspension, from Henkel which has been heated to evaporate some of the isopropanol solvent, to reduce the overall mass of the suspension by about 20-30%, or about 25-26% of the commercially available suspension.

The viscosity of coating fluid(s) 18 may be adjusted by varying/adjusting the amount of solvent(s), ratio of solvents, coating material(s), or other components of coating fluid(s) 18 as required. For example, as the percentage of solid material(s) in coating fluid(s) 18 is increased (e.g. the volumetric solids concentration or weight percentage of solids is increased), the viscosity of the coating fluid(s) 18 may also be increased. Increasing the viscosity of the coating fluid(s) 18 may also be accomplished by decreasing the amount of solvent(s) in coating fluid(s) 18. For example, some of the solvent(s) may be evaporated under heating and/or vacuum. Alternatively, the viscosity may be decreased by adding solvent(s) to coating fluid(s) 18.

The viscosity of coating fluid(s) 18 may be adjusted so that no substantial flow of coating fluid(s) 18 occurs after smoothing member 22 has been passed through tube 10. In other words, the viscosity of coating fluid(s) 18 may be selected/adjusted so that a desired predetermined wet film thickness Twf may be maintained against internal surface(s) 16 of tube 10. As will be apparent to one of ordinary skill in the art, the required viscosity of coating fluid(s) 18 to achieve and substantially maintain the desired wet film thickness Twf may depend on factors such as the orientation of internal surface(s) 16 (i.e. effects of gravity), the density and surface tension of coating fluid(s) 18 and the wettability of internal surface(s) 16.

Therefore, the viscosity and possibly other properties of coating fluid(s) 18 may be selected/adjusted according to specific process parameters and according to the desired properties of coating(s) 14.

Using coating fluid(s) 18 of adequate viscosity, a relatively uniform coating thickness (e.g. wet film thickness Twf) may be obtained across internal surface(s) 16 (e.g. along substantially an entire length) of tube 10 even if tube 10 is inclined relative to the horizontal or oriented substantially upright (i.e. vertical) during the application of coating fluid(s) 18 and/or passing of smoothing member 22. The desired final thickness Tf of coating(s) 14 may be achieved by adjusting the initial viscosity of coating fluid(s) 18. As mentioned above, the wet film thickness Twf may be correlated to the final thickness Tf of coating(s) 14. For example, the wet film thickness Twf of coating fluid(s) 18 following the passing of smoothing member 22 and prior to curing/drying may be about ten times the desired final (i.e. dry/cured) thickness Tf of coating(s) 14 depending on the properties and contents of coating fluid(s) 18. Accordingly, depending on the process parameters and within limits, the viscosity of coating fluid(s) 18 may be selected/adjusted so that a wet film thickness Twf may be achieved to produced coating(s) 14 having a desired final thickness Tf in a single application. Alternatively, if a desired final thickness Tf of coating(s) 14 may not be achieved in a single application, steps/portions of processes 40, 400 may be repeated for multiple applications.

Smoothing member 22 may have an overall dimension (e.g. maximum diameter) less than a corresponding overall dimension (e.g. maximum diameter) of internal cavity 12 of tube 10. Specifically, for a circular tube, smoothing member 22 may have a circular cross section with a maximum outer diameter OD that is less than the internal diameter of internal cavity 12 of tube 10. Outer diameter OD of smoothing member 22 may be selected so that a clearance substantially equal to the pre-determined wet film thickness Twf may be provided between smoothing member 22 and internal surface(s) 16 of tube 10. Smoothing member 22 may have a generally "bullet" shape and comprise a generally pointed leading end 26, a relatively square trailing end and a cross section adapted for the cross-sectional profile of internal cavity 12 of tube 10. The trailing end of tube 10 may have a relatively sharp corner, for example a corner that has not been substantially rounded.

Smoothing member 22 may have a generally cylindrical shape, and may be textured, or have straight or spiral striations on its surface. In some applications such as for nuclear fuel sheaths with an internal graphite coating, the use of a smoothing member 22 with an outer diameter OD of about 0.6+/−0.005 mm smaller than the internal diameter of tube 10 may be suitable for the application of the graphite coating of suitable final thickness Tf. In other applications, the desired final thickness Tf of coating(s) 14 may be achieved through proper selection of properties (e.g. viscosity) of coating fluid(s) 18 to achieve a desired wet film thickness Twf and also through the proper selection of a corresponding overall dimension of smoothing member 22.

Smoothing member 22 may be made from any suitable solid, durable material such as but not limited to metal, plastic, ceramic or a combination of materials. Smoothing member 22 may be made of metal such as, for example, stainless steel or lead. As explained above, smoothing member 22 may be propelled through tube 10 exclusively by gravity, by other propulsion means or a combination thereof. Additionally the length and/or weight of smoothing member 22 may be selected based on the viscosity of coating fluid(s)

18 and diameter of tube 10 to achieve a desired speed at which smoothing member 22 may be passed through tube 10 when smoothing member 22 is permitted to free fall under the influence of gravity.

One or more smoothing members 22 together with one or more coating fluids 18 may be provided together as a kit useful in the application of coating(s) 14 to internal surface(s) 16 of tube 10 of pre-determined cross-sectional dimension(s). For example, such kit may comprise: coating fluid(s) 18 for application to internal surface(s) 16 of tube 10 and smoothing member(s) 22 configured to be passed through tube 10 while substantially maintaining a minimum separating distance between smoothing member(s) 22 and internal surface(s) 16 of tube 10. Coating fluid(s) 18 may be adapted to produce layer 20 of coating fluid(s) 18 having a thickness substantially equal to or in excess of predetermined wet film thickness Twf. The distance maintained between smoothing member(s) 22 and internal surface(s) 16 of tube 10 may correspond substantially to predetermined wet film thickness Twf of coating fluid(s) 18. The predetermined wet film thickness Twf may be correlated to desired final thickness Tf of coating(s) 14.

Tube 10 may be made of any material suitable for the particular application, including but not limited to plastic, ceramic, metal and metal alloys. Coating fluid(s) 18 and tube 10 may be compatible such that the solvent(s) from coating fluid(s) 18 do(es) not react with, dissolve or be otherwise damaging to the tube material(s). The tube material(s) and coating material(s) may also be compatible such that the coating material may adhere to the internal surface(s) 16 of tube 10 upon drying/curing. Tube 10 may also be of any diameter useful in industry. Tube 10 may have a non-circular cross-section and smoothing member 22 may have a corresponding cross-section suitable to achieve a uniform or otherwise desirable final thickness Tf of coating(s) 14 across the desired portion of internal surface(s) 16 the tube 10. For example, smoothing member 22 may be configured to produce a non-uniform final thickness of coating(s) 14 about the cross section of internal cavity 12 of tube 10.

Tubes manufactured using processes 40, 400 may have interior coating(s) 14 that is/are thicker than that obtainable using other methods. For example, using processes 40, 400, it may be possible to produce coatings having larger final thicknesses Tf in fewer applications in comparison with other methods.

Some additional steps may be required or desired depending on the specific process conditions. For example, it may be desirable that internal surface(s) 16 of tube 10 be pre-cleaned to smoothen and/or remove any contaminants from internal surface(s) 16 and/or be otherwise prepared to permit suitable adhesion of coating(s) 14. It may also be desirable that tube 10 be cured at increased temperatures and/or pressures to accelerate drying/curing of coating fluid(s) 18.

It may also be desirable or required that multiple applications of coating fluid(s) 18 be made to achieve coating(s) 14 of a desired final thickness Tf and properties. For example, it may be desirable that coating fluid(s) 18 of differing compositions be used for subsequent application(s). When making a subsequent application, the orientation of tube 10 may be changed (e.g. reversed) from the orientation at which the previous application was made. When making subsequent applications, a smaller smoothing member 22 may be required to take into account the increasing thickness of coating(s) 14.

The following examples are provided for illustrative purposes only to further characterize the processes and devices described herein. It should be noted that the following examples are not intended limit the scope of the present disclosure in any way.

EXAMPLE 1

Coating Process and Analysis

The interior of a Zircaloy™ tube was first washed out with isopropanol. During washing, the isopropanol was poured into the tube until the tube was half full and then the tube was end-capped and shaken. The isopropanol was then drained from the tube and the tube allowed to dry on a drying rack with fans for at least ten minutes to evaporate the isopropanol.

To apply the coating, the tube was held in an upright (i.e. substantially vertical) position either in a burette holder or on a tube rack. A commercially available graphite suspension (DAG-154N, Henkel) was concentrated by heating the suspension below the isopropanol solvent boiling point (82.5° C.) while stirring. The suspension was evaporated until the desired mass reduction, caused by loss of solvent, was achieved. For a DAG-154N coating on Zircaloy™ tubing, the desired reduction in mass may be about 20-30% and preferably about 25-26%. If the mass reduction of the heated suspension exceeded the desired mass reduction, excess solvent was added to adjust the concentration of the suspension.

While still at elevated temperature, the concentrated suspension was injected into the bottom of the tube and the tube was filled with suspension to within a few millimeters of the top of the tube using a syringe sealed to the bottom of the tube. The suspension was then allowed to drain from the bottom of the tube, leaving a relatively thick coating of liquid suspension on the interior surface of the tube. A bullet shaped stainless steel smoothing member was introduced into the top of the tube and dropped to allow the smoothing member to fall through the tube by gravity, leaving a wet suspension layer on the inside of the tube. The suspension layer remaining on the interior of the tube was air dried by blowing air through the tube for at least an hour. The dried tube was then vacuum baked at 350° C. to remove excess hydrogenous material from the graphite coating. Hydrogenous material is deleterious to the performance of nuclear fuel and thus this requirement may be unique to the coating of nuclear fuel sheaths and not specifically to coating processes used for other applications. Hydrogen analysis was performed by Cameco Fuel Manufacturing, a commercial manufacturer of CANDU power-reactor fuel. All samples had hydrogen concentrations below the maximum limit for CANDU fuel.

Dry coating layers (i.e. final thicknesses Tf) achieved using the process of Example 1 can exceed 10 microns, and can be between 10 and 30 microns or thicker if required.

Thickness Measurements Using Microscopic Analysis

Following vacuum baking, a tube was cut axially using a low-speed diamond wheel saw at predetermined locations to produce ring samples. The ring samples were mounted in epoxy resin and cut radially on the low-speed diamond wheel saw such that two half circle specimens were formed. The cut surface from one of the halves was polished to produce the sample for microscopic examination. A metallurgical microscope with the aid of digital image analysis was used to measure the thickness of the graphite coating.

Figure 5:
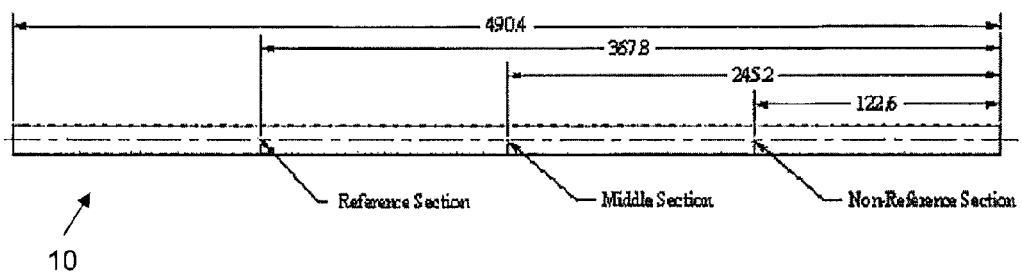
FIG. 5 shows locations selected for sectioning a coated tube for measuring coating thickness.

Ring samples were taken from three axial positions on the tube and six (6) graphite coating thickness measurements were taken at each of these three positions for a total of 18 measurements per tube. The location of the measurements taken for each ring sample is shown in FIG. 5. An example set of results taken from a ring section is shown in Table 1 below.

TABLE 1

Metallurgical Examination Thickness Measurements (μm)

| Test # | Non-reference Section | Middle Section | Reference Section |
|---|---|---|---|
| 1 | 33.5 | 27.2 | 34.0 |
| 2 | 25.0 | 25.7 | 34.9 |
| 3 | 29.8 | 32.8 | 36.1 |
| 4 | 29.3 | 28.1 | 25.3 |
| 5 | 30.9 | 30.1 | 24.1 |
| 6 | 27.4 | 28.9 | 23.0 |

Scratch Test

Figure 6:
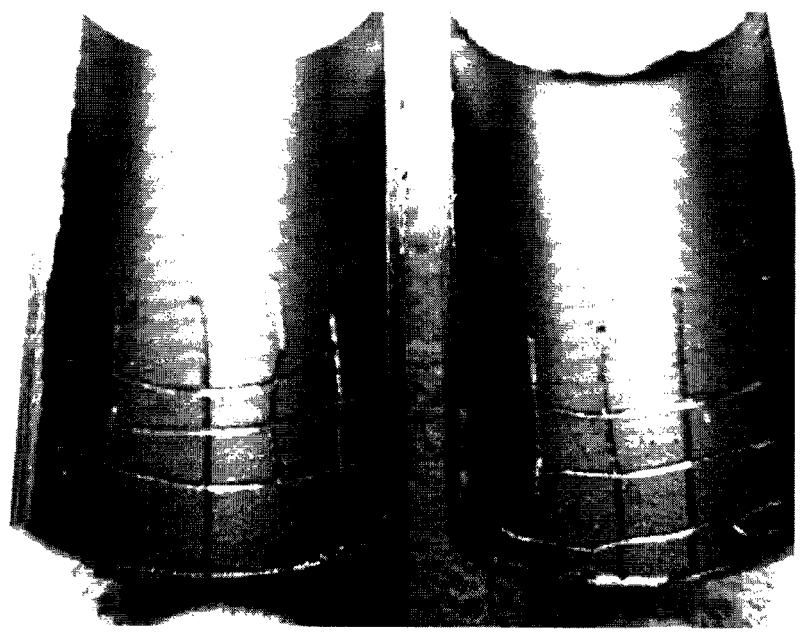
FIG. 6 shows results of a scratch test conducted on a coated tube.

A scratch test is an extreme test of the adherence of a coating to the interior surface of the tube. While conducting this test, a section of the coated tube was cut in half exposing the coated surface. A cross hatch pattern was scratched into the surface. An acceptable result is that the coating present between the scratches does not flake off or only a relatively small amount flakes off. An example of a scratch test using a graphite coating on a Zircaloy™ tube is show in FIG. 6.

Pellet Loading Test

In nuclear applications wherein a Zircaloy™ fuel sheath is coated with graphite coating, a pellet loading test can be done to test the resiliency of the graphite coating under normal operating conditions. The pellet loading test is a duplication of the actual process of loading pellets and serves to demonstrate that the coating has sufficient strength and adherence to the internal surface(s) of the tube withstand the scraping action of pellet loading.

A pellet stack is formed, loaded and then unloaded. The extent of coating removed by the test is determined visually and the acceptability is semi-qualitative. Excessive amounts of graphite powder or flakes of graphite would not be acceptable.

Acceptance Criteria

Acceptance criteria for the microscopic metallurgical examination, scratch test, pellet loading test, as well as the hydrogen analysis are presented in Table 2 below. The acceptance criteria are presented for two different target coating thickness ranges (coatings 1 and 2) applied to two different sizes of tube/sheath (i.e. outside diameters of 11.5 mm and 13.5 mm). It is noted that coatings prepared according to the processes of Example 1 met the acceptance criteria listed below.

TABLE 2

Acceptance Criteria

| Outside Diameter of Sheaths (Coating #) | # of Sheaths | Test | # of Tests | Acceptance Criteria |
|---|---|---|---|---|
| 11.5 mm (Coating 1) | 5 | Metallurgical Examination (thickness measurements) | 3 | 10 μm local minimum; 25 μm local maximum; 12 μm to 22 μm average |
| | | Scratch | 2 | No flaking at scratch edges |
| | | Hydrogen Analysis | 2 | <0.7 mg H in coating |
| | | Pellet Loading | 2 | No observed flaking of coating upon unloading pellet stack |
| 13.5 mm (Coating 1) | 2 | Metallurgical Examination (thickness measurements) | 1 | 10 μm local minimum; 25 μm local maximum; 12 μm to 22 μm average |
| | | Scratch | 1 | No flaking at scratch edges |
| | | Hydrogen Analysis | 1 | <0.7 mg H in coating |
| | | Pellet Loading | 1 | No observed flaking of coating upon unloading pellet stack |
| 11.5 mm (Coating 2) | 5 | Metallurgical Examination (thickness measurements) | 3 | >20 μm average coating thickness |
| | | Scratch | 2 | No flaking at scratch edges |
| | | Hydrogen Analysis | 2 | <0.7 mg H in coating |
| | | Pellet Loading | 2 | No observed flaking of coating upon unloading pellet stack |
| 13.5 mm (Coating 2) | 2 | Metallurgical Examination (thickness measurements) | 1 | >20 μm average coating thickness |
| | | Scratch | 1 | No flaking at scratch edges |
| | | Hydrogen Analysis | 1 | <0.7 mg H in coating |
| | | Pellet Loading | 1 | No observed flaking of coating upon unloading pellet stack |

EXAMPLE 2

Coating Process Parameters

Table 3 shown below provides an indication of the effects of various parameters of processes 40,400 under three separate conditions on the final thickness Tf of a coating 14. The parameters of Table 3 are to be considered in conjunction with other process parameters described in Example 1 above. Specifically, the parameters of Table 3 also relate to the coating of a Zircaloy™ tube supported substantially upright (i.e. vertical) with the commercially available graphite suspension DAG-154N used as the coating fluid. Some of the parameters listed in relation to Conditions 1-3 below include: the solids content (Wt. % solids) of the coating fluid; the viscosity of the coating fluid (measured in centipoise); the inside diameter of the tube/sheath; the overall diameter of the smoothing member and whether the smoothing member was dropped (i.e. allowed to fall freely under the influence of gravity alone) or pulled (i.e. propelled by an applied force). Coating application under all three conditions was conducted at a temperature of around 60° C. The coating fluid exhibited a pseudoplastic behavior at this temperature.

TABLE 3

Effects of Process Parameters on Final Coating Thickness

| Parameter | Condition 1 | Condition 2 | Condition 3 |
|---|---|---|---|
| Wt. % solids of Coating Fluid | 24 | 30 | 30 |
| Viscosity of Coating Fluid | Not measured | 977 cP at 60° C. | 977 cP at 60° C. |
| Inside Diameter of Tube/Sheath (mm) | 10.76 | 10.76 | 10.76 |
| Overall Diameter of Smoothing Member (mm) | 10.15 | 10.39 | 10.09 |
| Smoothing Member Pulled or Dropped | Pulled | Dropped | Dropped |
| Average Final Layer Thickness (microns) | 25 | 18 | 29 |

The above description is meant to be exemplary only, and one skilled in the art will recognize that changes may be made to the embodiments described without departing from the scope of the invention disclosed. For example, the upright orientation of tube 10 specifically shown in the figures may be useful and contribute to the self-centering behavior of smoothing member 22 but it is apparent from the above disclosure that tube 10 may not necessarily be oriented in an upright orientation. For example, tube 10 may be otherwise oriented (e.g. inclined) with respect to vertical and horizontal orientations so long as smoothing member 22 is adapted (e.g. supported) to maintain an appropriate distance between the smoothing member 22 and the portion of internal surface(s) 16 of tube 10 to be coated so that a desired wet film thickness Twf of coating fluid(s) 18 may be applied to desired surface(s) 16 or portion of surface(s) 16. Still other modifications which fall within the scope of the present invention will be apparent to those skilled in the art, in light of a review of this disclosure, and such modifications are intended to fall within the appended claims.

The invention claimed is:

1. A method of applying a coating of a desired final thickness to at least a portion of an internal surface of a tube, the method comprising:

applying a layer of coating fluid to the portion of the internal surface of the tube, the coating fluid having a viscosity selected so that the applied layer of coating fluid has a thickness substantially equal to or in excess of a predetermined wet film thickness correlated to the desired final thickness of the coating; and after said applying a layer, while the coating fluid-applied portion of the internal surface of the tube is supported in a substantially upright orientation, inserting a smoothing member into an end of the tube and passing the smoothing member through the tube in a spaced apart relationship relative to, and at a minimum distance from, the coating fluid-applied portion of the internal surface of the tube, the minimum distance corresponding substantially to the wet film thickness, the smoothing member being configured to smooth the coating fluid and remove coating fluid in excess of the wet film thickness from the portion of the internal surface of the tube.

2. The method of claim 1, wherein the coating fluid has a viscosity selected so that the applied layer of coating fluid has a thickness substantially equal to or in excess of the predetermined wet film thickness when the coating fluid-applied portion of the internal surface of the tube is in the substantially upright orientation.

3. The method of claim 1, comprising allowing the smoothing member to pass across the coating fluid-applied portion of the internal surface of the tube under the influence of gravity.

4. The method of claim 1, wherein the coating fluid comprises a slurry.

5. The method of claim 4, comprising selecting a solids concentration of the slurry based on the predetermined wet film thickness correlated to the desired final thickness of the coating.

6. The method of claim 1, comprising selecting a smoothing member having an overall outer dimension based on the predetermined wet film thickness correlated to the desired final thickness of the coating.

7. The method of claim 1, comprising passing the smoothing member substantially coaxially with a central axis of the tube.

8. The method of claim 1, comprising filling the tube with coating fluid and allowing some of the coating fluid to drain from the tube prior to passing the smoothing member.

9. A method of applying a coating of a desired final thickness to an inside surface of a nuclear fuel sheath, the method comprising:

applying a layer of coating fluid to the inside surface of the sheath, the coating fluid having a viscosity selected so that the applied layer of coating fluid has a thickness substantially equal to or in excess of a predetermined wet film thickness correlated to the desired final thickness of the coating; and after said applying a layer, while the sheath is supported in a substantially upright orientation, inserting a smoothing member into an inside cavity of the sheath through an end of the sheath and passing the smoothing member through the cavity while substantially maintaining a minimum separating distance between the smoothing member and the inside surface of the sheath, the minimum separating distance corresponding substantially to the wet film thickness, the smoothing member being configured to smooth the coating fluid and remove coating fluid in excess of the wet film thickness from the inside surface of the sheath.

10. The method of claim 9, wherein the coating fluid has a viscosity selected so that the applied layer of coating fluid has a thickness substantially equal to or in excess of the predetermined wet film thickness when the sheath is in the substantially upright orientation.

11. The method of claim 9, wherein applying the layer of coating fluid comprises filling the sheath with coating fluid and then permitting some of the coating fluid to drain from the sheath.

12. The method of claim 9, wherein passing a smoothing member through an inside cavity of the sheath comprises allowing the smoothing member to fall freely under influence of gravity.

13. The method of claim 12, comprising keeping the smoothing member substantially coaxial with a central axis of the sheath during passing of the smoothing member.

14. The method of claim 9, comprising keeping the smoothing member substantially centered inside the sheath during passing of the smoothing member through the inside cavity of the sheath.

15. The method of claim 9, wherein the coating fluid comprises graphite and a solvent.

16. The method of claim 9, comprising adjusting the viscosity of the coating fluid to obtain a wet film thickness based on the predetermined wet film thickness correlated to the desired final thickness of the coating.

17. The method of claim 9, comprising curing the layer of coating fluid by exposing the sheath to elevated temperature and/or elevated pressure conditions.

18. A method of applying a coating to at least a portion of an internal surface of a tube, the method comprising:

applying a layer of coating fluid to the portion of the internal surface of the tube, the layer of coating having a thickness substantially equal to or in excess of a desired wet film thickness; and after said applying a layer, while the coating fluid-applied portion of the internal surface of the tube is supported in a substantially upright orientation, inserting a smoothing member into an end of the tube and passing the smoothing member through the tube in a spaced apart relationship relative to, and at a minimum distance from, the coating fluid-applied portion of the internal surface of the tube, thereby smoothing the applied layer, the minimum distance corresponding substantially to the wet film thickness of the layer of coating fluid, the smoothing member being configured to smooth the coating fluid and remove coating fluid in excess of the wet film thickness from the portion of the internal surface of the tube.

19. A kit for applying a coating to an internal surface of a tube having a predetermined cross-sectional dimension, the kit comprising:

a coating fluid for application to the internal surface of the tube, the coating fluid being adapted to produce a layer of coating fluid having a thickness substantially equal to or in excess of a predetermined wet film thickness when the coating fluid-applied portion of the internal surface of the tube is in a substantially upright orientation; and a smoothing member configured to smooth an applied layer of coating fluid by being inserted into an end of the tube after application of a coating fluid and passed through the tube while substantially maintaining a minimum separating distance between the smoothing member and the internal surface of the tube and while the coating fluid-applied portion of the internal surface of the tube is in the substantially upright orientation, the minimum separating distance corresponding substantially to the wet film thickness of the coating fluid.

* * * * *